Oct. 10, 1944.  F. E. BACHMAN  2,360,190
SPRING GROUP
Filed July 16, 1941  3 Sheets-Sheet 1

INVENTOR.
Fred E. Bachman
BY
ATTY.

Oct. 10, 1944.                F. E. BACHMAN                2,360,190
                               SPRING GROUP
                           Filed July 16, 1941              3 Sheets-Sheet 2
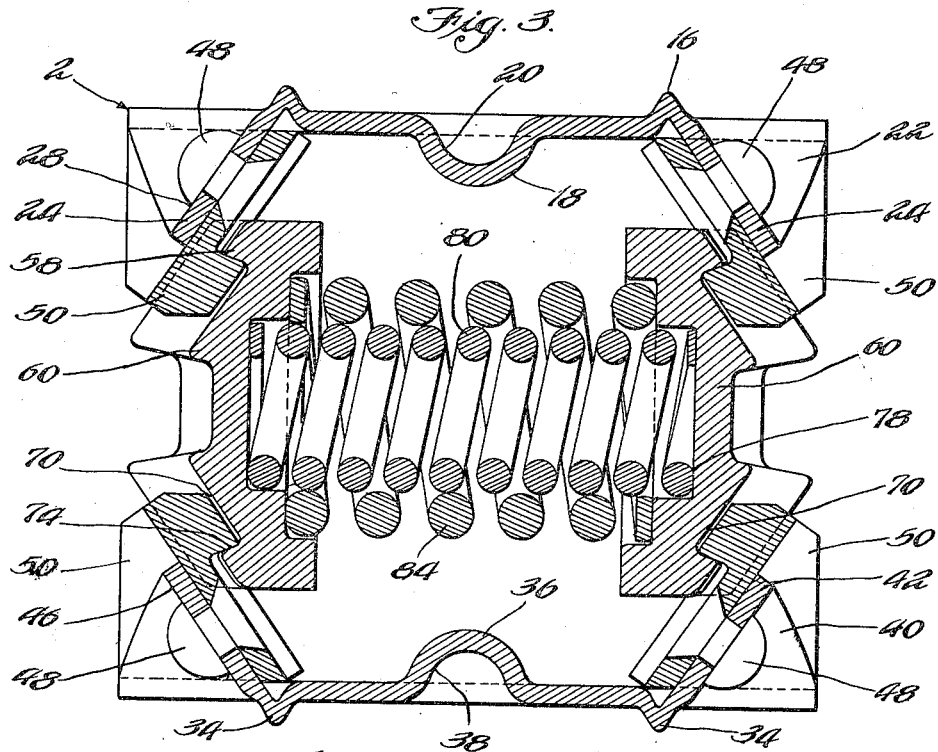
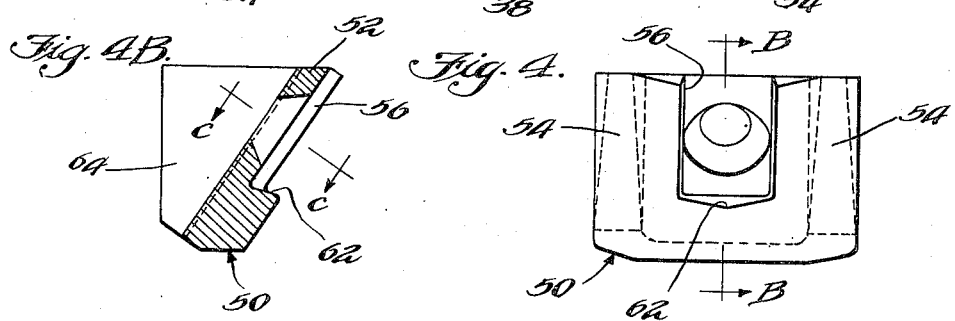
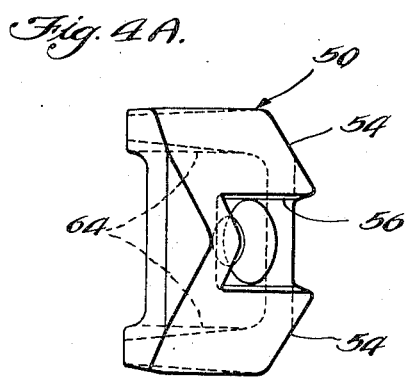
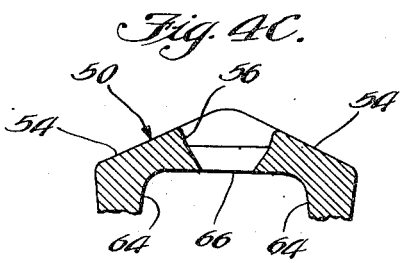
INVENTOR.
Fred E. Bachman
BY
ATTY.

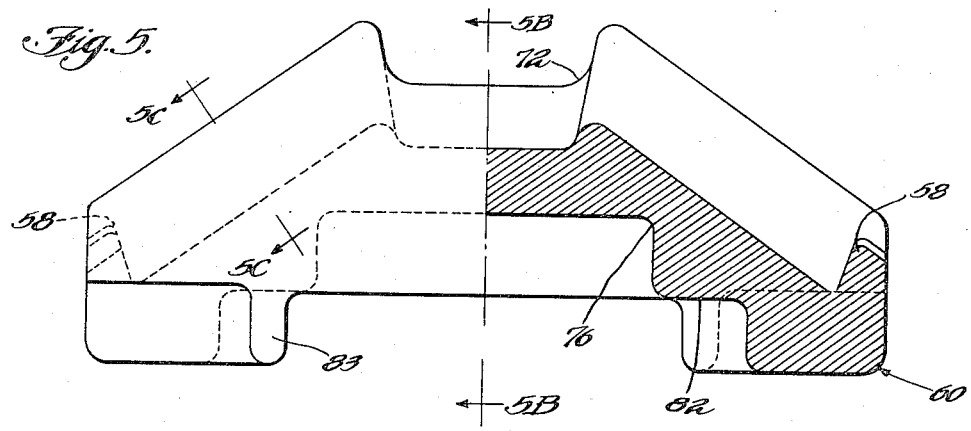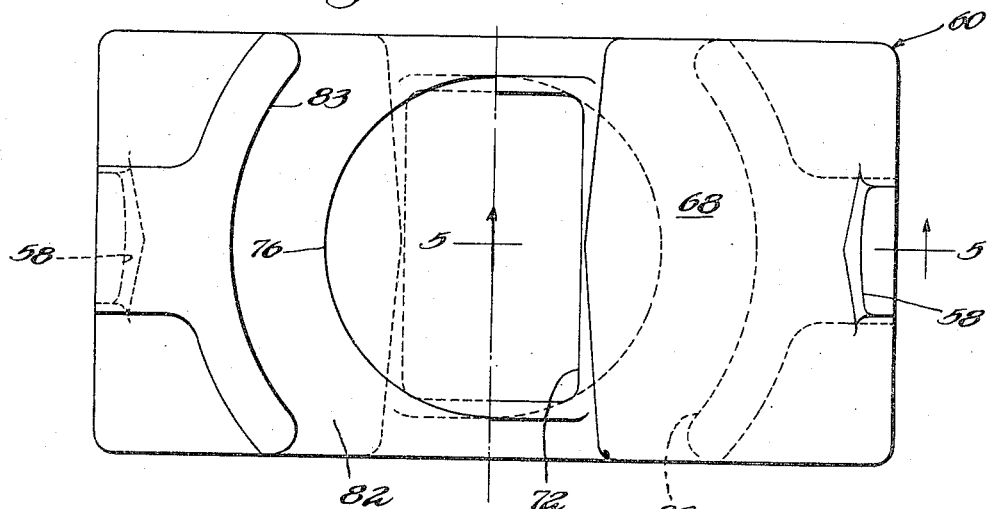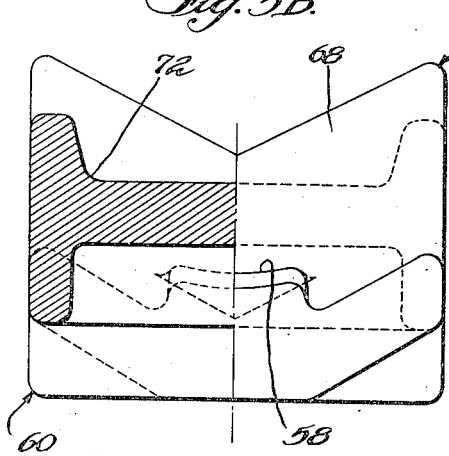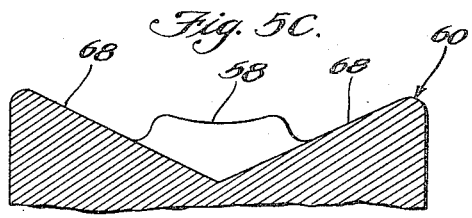

Patented Oct. 10, 1944

2,360,190

UNITED STATES PATENT OFFICE 2,360,190

SPRING GROUP

Fred E. Bachman, Chicago, Ill., assignor to American Steel Foundries, Chicago, Ill., a corporation of New Jersey Application July 16, 1941, Serial No. 402,616

21 Claims. (Cl. 267—9)

My invention relates to spring units and more particularly to a composite spring group which may support a bolster on a side frame in well known types of railway freight car trucks.

The main object of my invention is to design a spring group comprising coil springs and a friction absorbing device wherein the wedge follower elements of the device are easily and conveniently associated with the top and bottom spring plates of the spring group.

Another object of my invention is to design a spring group wherein means are formed on opposite sides of the top and bottom spring plates and upon which separately manufactured wedge friction elements may be easily assembled.

A specific object of my invention includes a composite spring group comprising spaced coil springs and a friction absorbing device between said springs, said device having wedge follower elements secured in a convenient manner to opposite sides of said top and bottom spring plates and side wedges urged into frictional engagement with said follower wedge elements by resilient means compressed between said side wedges.

A particular advantage of my invention is that the wedge elements of the friction absorbing device may be separately manufactured of materials which will most effectively develop friction and which may be easily replaced when worn.

In the drawings,

Figure 3 is a sectional view taken through the spring group shown in Figure 1 in a vertical plane transversely bisecting said group as indicated by the line 3—3 of Figure 1.

Figures 1, 2:
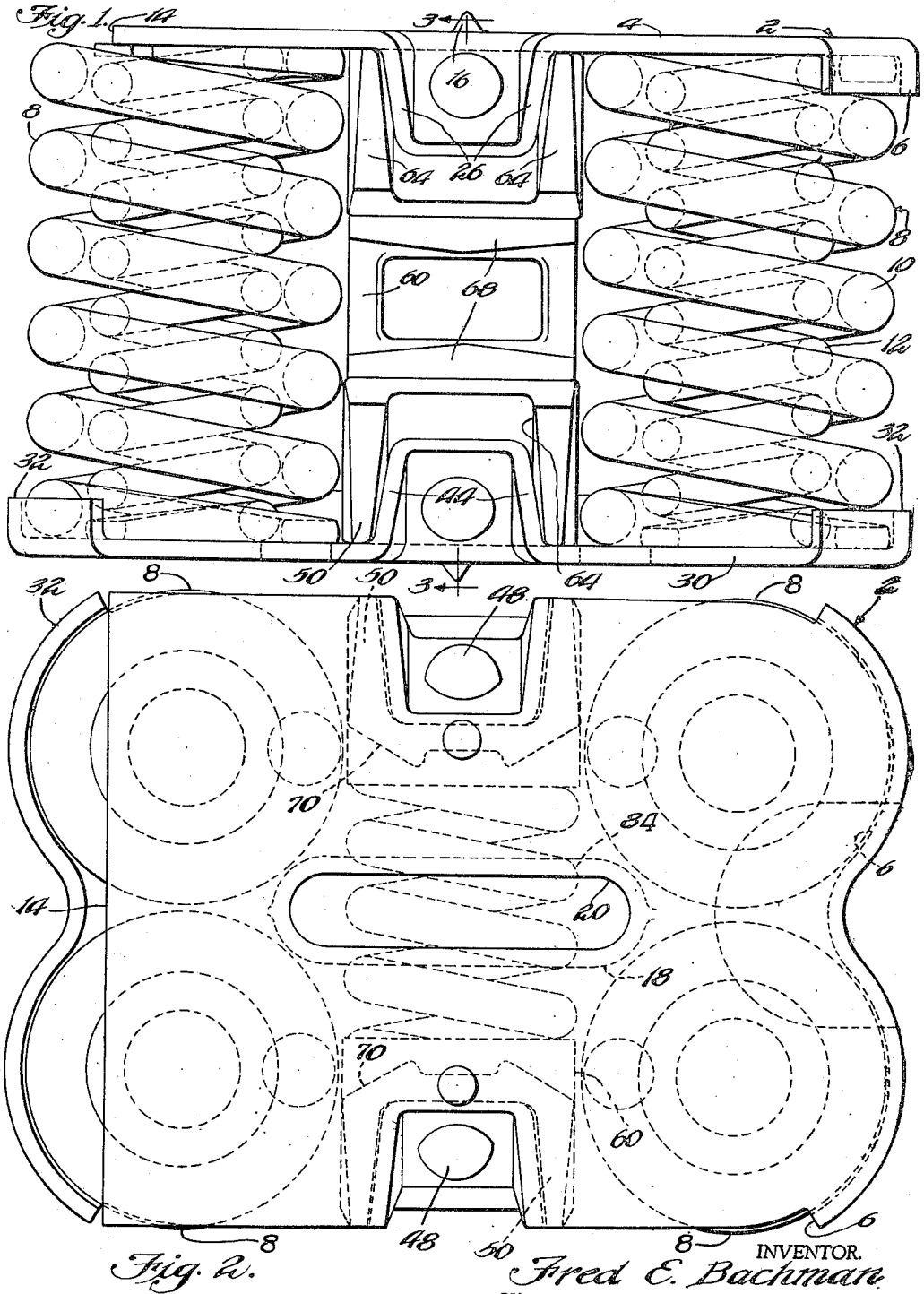
Figure 1 is a side elevation of a spring group involving my invention.
Figure 2 is a top plan view of the spring group shown in Figure 1.

Figures 4, 4A, 4B, and 4C are detailed views of a follower wedge element used in the friction absorbing device associated with the spring group shown in Figure 1, Figure 4 being a side view, and Figure 4A being a bottom view of the shoe shown in Figure 4. Figure 4B is a sectional view taken in a plane bisecting the shoe as indicated by the line B—B of Figure 4, and Figure 4C is a fragmentary sectional view taken substantially in the plane indicated by the line C—C of Figure 4B.

Figures 5, 5A, 5B, and 5C are detailed views of a side wedge used in the friction absorbing device shown in Figure 1, Figure 5 being a side elevation, half in section, the section being taken substantially in the plane bisecting the shoe longitudinally as indicated by the line 5—5 of Figure 5A. Figure 5A is a plan view of the side wedge, the left half thereof being a bottom plan view, and the right half being a top plan view. Figure 5B is an end view of the side wedge, half in section, the section being taken substantially in a plane bisecting the shoe transversely as indicated by the line 5B—5B of Figure 5. Figure 5C is a fragmentary sectional view taken substantially in the plane indicated by the line 5C—5C of Figure 5.

The spring group generally indicated at 2 may be interposed between a supported bolster and a supporting side frame of well-known railway freight car trucks. The top spring plate 4 is formed with downwardly turned arcuate flanges 6, 6 presenting a scallop-like configuration as best seen in Figure 2 and serving to position the upper ends of the outer coil spring groups 8, 8. Each spring group 8 may comprise an outer coil spring 10 and an inner coil spring 12. The opposite end of the spring plate 4 may be cut off squarely as at 14 to afford clearance for the bottom wall of the superposed associated bolster member which is seated on top of the spring plate 4. Inboard coil spring groups 8, 8 arranged similarly to the outboard coil spring groups 8, 8 support the inboard end of the top spring plate 4. Upwardly projecting lugs 16, 16 on the spring plate are adapted to be accommodated within recesses on the associated bolster for positioning said plate. The spring plate 4 may be stiffened by a central longitudinally extending arcuate rib or convolution 18 which defines a channel 20 in the top surface of the spring plate. At each side of the top spring plate 4 and intermediate the inboard and outboard coil spring groups 8, 8 is formed a downwardly projecting member 22 having an outwardly directed diagonal wall 24 and spaced side walls 26, 26 defining with said diagonal wall 24 an outer recess 28.

The bottom spring plate 30 is afforded at opposite ends upstanding arcuate flanges 32, 32 of scallop-like form serving to position the bottom ends of the coil spring groups 8, 8. Downwardly projecting studs 34, 34 are adapted to be accommodated within recesses on the spring seat of an associated side frame member for positioning the bottom spring plate. The bottom spring plate may also be formed with a longitudinally extending arcuate rib or convolution 36 which defines a channel 38 in the bottom surface of said plate and which serves to stiffen the plate. Centrally at each side of the bottom spring plate and aligned with each downwardly projecting member 24 on the top spring plate is an upstanding member 40 comprising an outwardly directed diagonal wall 42 and spaced side walls 44, 44 which define a recess 46.

The recesses 28, 28 and 46, 46 accommodate therewithin the heads of rivets 48, 48 which secure to the respective diagonal walls 24, 24 and 42, 42 the wedge follower elements 50, 50 seated against the inner surfaces of said diagonal walls.

The details of the wedge follower elements 50, 50 are shown in Figures 4, 4A, 4B, and 4C wherein it may be noted that each wedge follower element comprises a diagonal wall 52 presenting spaced diagonal friction surfaces 54 and an intervening channel or slot 56 which is adapted to accommodate a lug 58 formed on the associated side wedge element 60. One end of the slot 56 is defined by a shoulder 62 affording an abutment for the associated lug 58. The diagonal wall 52 together with the spaced side walls 64, 64 present a substantially U-section and define a recess 66 within which may be accommodated the associated projecting member 22 or 40 in order to securely and firmly seat the wedge follower element 50 on the associated member 22 or 40. It is thus readily apparent that each wedge follower element may be simply and conveniently assembled with the associated spring plate.

The side wedges 60, 60 extend between the wedge follower elements on the top and bottom spring plates and present diagonal V-shaped friction surfaces 68, 68 for complementary engagement as at 70, 70 with the surfaces 54, 54 on the wedge follower elements. Centrally between the diagonal V-shaped friction surfaces 68, 68 each side wedge may be transversely relieved as at 72, 72 to lighten the shoe and to prevent shoulders from forming because of frictional wear. At each end of the side wedge 60 and at the extremity of each friction surface 68 is formed the beforementioned lug 58 which slides in the channel 56 on the associated wedge follower element 50 for abutment with the shoulder 62 as at 74 to limit expansion of said device and to maintain said device in assembled relationship. On its opposite face each side wedge 60 has a central depression 76 affording an annular seat at 78 for an inner coil spring 80 which extends transversely between the side wedges. Outwardly of the central depression 76 is formed an annular seat 82 for an outer coil spring 84 sleeved over said inner spring 80 and also compressed between the side wedges 60, 60, said seat 82 being defined by arcuate flanges 83, 83 and being of greater diameter than the annular seat at 78.

When assembled, the composite spring group comprising the coil spring groups 8, 8 and the friction absorbing device may be handled as a unit because of the interlocking of the lugs 58, 58 on the side wedges with the shoulders 62, 62 on the wedge follower elements. The friction absorbing device may be afforded some precompression in its normal released position and when load is applied the movement of the follower wedges toward each other is resisted by the frictional engagement as at 70, 70 between the side wedges and the follower wedge elements.

It is readily apparent that the wedge follower elements may be easily manufactured of suitable friction material and applied to spring plates of the form shown herein to afford a spring group with a friction absorbing device having desirable friction characteristics.

It is to be understood that I do not wish to be limited by the exact embodiment of the device shown which is merely by way of illustration and not limitation as various and other forms of the device will, of course, be apparent to those skilled in the art without departing from the spirit of the invention or the scope of the claims.

I claim:

1. In a spring group, spaced spring plates, coil springs interposed between said plates at opposite ends of said group, a friction absorbing device operable between said plates intermediate said springs, and inward projecting members on opposite sides of each plate, each member presenting spaced side walls and a connecting diagonal wall, said device including friction follower elements each seated against the associated diagonal wall and embracing said side walls, and means securing said friction elements to said diagonal walls respectively.

2. In a spring group for a railway truck, top and bottom spring plates each having diagonally arranged members at opposite sides thereof and longitudinally extending reinforcing means intermediate its edges, spaced coil springs extending between said plates and having their ends positioned thereon, friction elements secured to said diagonal members, side wedges each extending between friction elements on said top and bottom spring plates for frictional and for interlocking engagement therewith, and resilient means under compression between said wedges.

3. In a composite spring group for a railway car truck, spaced spring plates, coil springs interposed therebetween at each end of said group, inward diagonally extending members integrally formed at opposite sides of each plate between said springs, friction elements each having a diagonal wall seated against the associated member and side walls embracing said member, friction shoes extending between certain of said elements for engagement therewith, and resilient means compressed between said shoes.

4. In a composite spring group for a railway car truck, spaced spring plates, coil springs interposed therebetween at each end of said group, inward diagonally extending members integrally formed at opposite sides of each plate between said springs, friction elements fixed on said members respectively, side wedges engaging certain of said elements, transversely extending springs compressed between said side wedges, and longitudinal reinforcing means on each plate.

5. In a composite spring group for a railway car truck, spaced spring plates, coil springs interposed therebetween at each end of said group, inward diagonally extending members integrally formed at opposite sides of each plate between said springs, friction elements fixed on said members respectively and each element presenting spaced diagonal friction surfaces, side wedges each having frictional engagement with the surfaces on certain of said elements, and resilient means interposed between said side wedges.

6. In a spring group for a railway truck, top and bottom spring plates each having diagonally arranged members at opposite sides thereof and stiffening means between said members, spaced coil springs extending between said plates and having their ends positioned thereon, frictional elements fitted over said diagonal members and secured thereagainst respectively, side wedges each frictionally engaging certain of said elements, and resilient means compressed between said wedges.

7. In a spring group, spaced spring plates, coil springs interposed between said plates at opposite ends of said group, and a friction absorbing device operable between said plates intermediate said springs, each plate having on its opposite sides inward projecting members each presenting spaced side walls and a connecting diagonal wall, said device including friction follower elements each seated against the associated diagonal wall and embracing said side walls.

8. In a spring group for a railway truck, top and bottom spring plates each having diagonally arranged members at opposite sides thereof, spaced coil springs extending between said plates and having their ends positioned thereon, friction elements secured to said diagonal members, side wedges each frictionally engaging certain of said elements, resilient means compressed between said wedges, and longitudinal reinforcing means on each spring plate.

9. In a spring group for a railway truck, top and bottom spring plates each having diagonally arranged members at opposite sides thereof, spaced coil springs extending between said plates and having their ends positioned thereon, friction elements secured to said diagonal members, side wedges each frictionally engaging certain of said elements, and resilient means compressed between said wedges.

10. In a composite spring group for a railway car truck, spaced spring plates, coil springs interposed therebetween at each end of said group, inward diagonally extending members integrally formed at opposite sides of each plate between said springs, friction elements fixed on said members respectively, side wedges engaging certain of said elements, and transversely extending springs between said side wedges.

11. In a spring group, spaced spring plates, coil springs interposed therebetween at opposite ends of said plates, diagonal members on opposite sides of each plate between said springs, a frictional element embracing each diagonal member for securement thereto, side wedges interlocked with and frictionally engaging certain of said elements, and resilient means between said wedges for urging them into tight engagement with said frictional elements.

12. A spring plate for a composite spring group comprising arcuate inwardly directed flanges at each end for positioning associated coil springs, inward diagonally directed members pressed in opposite sides of said plate between its ends for supporting friction elements, and stiffening means on said plate for holding its ends in substantially the same plane.

13. In a friction element, a member having a friction face on one side thereof interrupted by a channel, a recess in the opposite side of said member, and an opening extending through said member and into said channel and said recess, said opening being formed and arranged for the reception of means securing said member to an associated support member, and said recess being formed and arranged for the reception of said support member.

14. A composite spring group for a railway truck including top and bottom spring plates affording positioning means for ends of coil springs and supporting means for friction follower elements, said supporting means comprising members integrally formed at opposite sides of each spring plate, each member having spaced side walls joined by a diagonal wall.

15. A spring plate for a composite spring group comprising intermediate the ends thereof a corrugated portion affording support for an inwardly directed diagonal friction member on at least one side thereof, and positioning means on at least one end of said plate for associated coil springs, and means on said friction member affording an interlock with an associated friction member.

16. In a spring group, spaced spring plates, coil springs interposed between said plates at opposite ends of said group, and a friction absorbing device operable between said plates intermediate said springs, each plate having on its opposite sides inward diagonally projecting members, said device including friction follower elements supported by said members respectively.

17. A spring plate for a composite spring group comprising intermediate the ends thereof corrugations supporting inwardly directed diagonal friction members at opposite sides thereof, and positioning means on at least one end of said plate for associated coil springs.

18. A spring plate for a composite spring group comprising arcuate inwardly directed flanges at each end for positioning associated coil springs, and inward diagonally directed members pressed in opposite sides of said plate between its ends for supporting friction elements.

19. A spring plate for a composite spring group comprising intermediate the ends thereof corrugations supporting inwardly directed friction members at opposite sides thereof, and positioning means on at least one end of said plate for associated coil springs.

20. A spring plate for a composite spring group comprising arcuate inwardly directed flanges at each end for positioning associated coil springs, and corrugations spaced from the ends of said plate and affording support for inwardly diagonally directed friction members on opposite sides of said plate.

21. A spring plate for a composite spring group comprising an arcuate inwardly directed flange on at least one end thereof for positioning associated coil springs, and a corrugated portion affording support for an inwardly directed friction member on at least one side of said plate spaced from its ends.

FRED E. BACHMAN.